(12) United States Patent
Johnson (10) Patent No.: US 6,700,060 B1
(45) Date of Patent: Mar. 2, 2004

(54) AUXILIARY WIRING TROUGH

(75) Inventor: Jeffrey L. Johnson, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/230,922

(22) Filed: Aug. 29, 2002

(51) Int. Cl.$^7$ ................................. H02G 3/04
(52) U.S. Cl. .................... 174/48; 174/68.1; 439/210
(58) Field of Search ..................... 174/48, 49, 50, 174/68.1, 95; 220/3.2, 3.8; 52/220.1, 220.3, 220.7; 439/210

(56) References Cited

U.S. PATENT DOCUMENTS

| | | | |
|---|---|---|---|
| 2,896,009 A | * | 7/1959 | Caveney .................... 174/72 A |
| 4,203,146 A | | 5/1980 | Sabatella et al. |
| 4,231,633 A | | 11/1980 | Luke et al. |
| 4,369,484 A | | 1/1983 | Fugate et al. |
| 4,517,623 A | | 5/1985 | Barner et al. |
| 4,683,517 A | | 7/1987 | Yazvac |
| 5,403,974 A | | 4/1995 | Leach et al. |
| 5,794,795 A | | 8/1998 | Stemmons |
| D404,011 S | | 1/1999 | Hurley |
| 5,861,576 A | | 1/1999 | Langston et al. |
| 5,933,066 A | | 8/1999 | Chontas et al. |
| 6,215,654 B1 | | 4/2001 | Wilkie, II et al. |
| 6,281,434 B1 | * | 8/2001 | Gretz ........................ 174/48 |
| 6,318,680 B1 | * | 11/2001 | Benedict et al. ............. 248/49 |
| 6,541,704 B1 | * | 4/2003 | Levenson et al. .......... 174/72 A |
| 6,576,834 B2 | * | 6/2003 | Coutant et al. ............... 174/48 |

* cited by examiner

Primary Examiner—Dhiru R Patel
(74) Attorney, Agent, or Firm—Martin J. Moran

(57) ABSTRACT

A wiring trough provides ease of installation onto a wide variety of metered panelboards, while also providing attractive aesthetics.

12 Claims, 8 Drawing Sheets

AUXILIARY WIRING TROUGH

BACKGROUND OF THE INVENTION

1. Field of the Invention

The present invention provides an improved auxiliary wireway trough for mounting to a metered panelboard.

2. Description of the Related Art

Wiring troughs are used to protect & secure the incoming entry wiring that energizes a metered panelboard. Many electricians facilitate the entry of wiring using a conduit and elbows. The elbow and conduit combination proves difficult to pull the cable through, and is an unattractive method.

Several presently available housings include various integral wiring troughs or conduits. Such integral wiring troughs are only useful with the particular housing for which they are designed, and significantly constrain the wiring installation space.

Accordingly, there is a need for an easily installed, aesthetically pleasing, rain-resistant wiring trough that may be used with a wide variety of metered panelboards.

SUMMARY OF THE INVENTION

The present invention provides an easily installed, aesthetically pleasing, wiring trough that may be used with a wide variety of metered panelboards.

The wiring trough includes a base, a cover, and a pair of end caps.

The base includes a first side for mounting to the side of the metered panelboard cabinet, a back extending substantially perpendicular to the first side, and a lip extending from the opposite edge of the back, substantially perpendicular to the first side. The first side includes a plurality of keyhole shaped openings dimensioned and configured for receiving an existing screw mounted on the metered panelboard. The edge of the first side opposite the back includes a lip having a plurality of mounting threaded studs extending therefrom, with the lip being substantially perpendicular to the first side, and the threaded mounting studs being substantially parallel to the first side.

The cover includes a first side and a front, with the front being dimensioned and configured to fit over the base's lip, and the first side having a plurality of apertures dimensioned and configured to receive the threaded mounting studs on the base. A lip extends from one edge of the first side, substantially parallel to and opposite the front. The cover has a J-shaped profile when viewed from either end.

A top end cap and a bottom end cap are dimensioned and configured for installation on the ends of the wiring trough. The top end fits over the wiring trough, while the bottom cap fits into the wiring trough. The top end cap includes a large aperture dimensioned and is configured to receive wiring, and a plurality of smaller holes for use in bolting a gasket and a hub cap to the top end cap. Both caps are secured to the base with rain-resistant rivets.

The wiring trough is typically installed with the top and bottom end caps secured in place, and the cover removed. To install the wiring trough on a metered panelboard, an opening provided by the electrician may be cut at the desired height on the metered panelboard. This facilitates the incoming wire entry from the wireway into the metered panelboard.

Next, a plurality of existing screws located in the side of the metered panelboard are loosened. The large diameter portions of the keyhole openings in the base are then positioned over these screw heads, and the base is slid downwards so that the narrow slotted portions of the keyhole openings engage the screw shafts. The screws are then retightened, thereby securing the wireway to the metered panelboard. A strip of adhesive-backed gasket material secured to the underside lip of the top cap is now compressed during this process forming a rain-resistant barrier between the wireway and the metered panelboard.

A gasket and hub cap bolted to the top end cap must then be removed, to allow the electrician to install the appropriate threaded hub mounting to pass the entry wires through into the wireway. The wireway provides ample access to navigate the wiring along the base, and into the metered panelboard, by having two open sides. Lastly, the cover is installed by sliding the top end underneath the top cap, and rotating the cover into position with the apertures on the first side engaging the threaded mounting studs on the base. Wing nuts with apertures may be installed on the threaded mounting studs to secure the cover in place. Additionally two screws secure the cover to the base flange near the backwall mounting. Additional mounting means, if so desired, are provided through the base backwall openings to further secure the wireway to the mounting structure.

The wiring trough is scaleable for facilitating auxiliary wire entry in other metered panelboards. In addition, the wiring trough is rain-resistant and sealable due to the external mounting method and the security hardware installed. This permits the device to be compliant with various utility specifications to prevent power theft.

DETAILED DESCRIPTION

The present invention provides an easily installed, aesthetically pleasing wiring trough that may be used with a wide variety of metered panelboards.

Referring to the drawings, the wiring trough 10 includes a base 12, a cover 14, a top ends cap 16, and a bottom ends cap 18.

Figure 1:
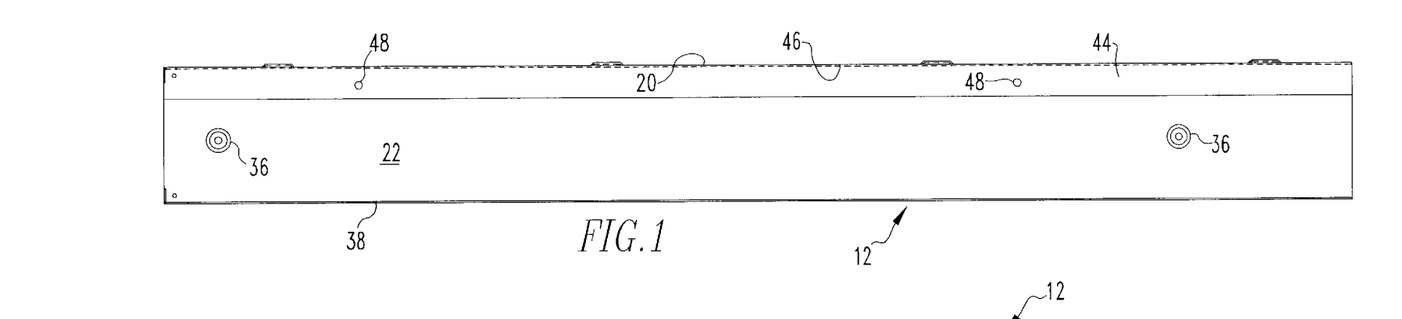
FIG. 1 is a front view of a base for a wire trough according to the present invention.
Figures 2, 3:
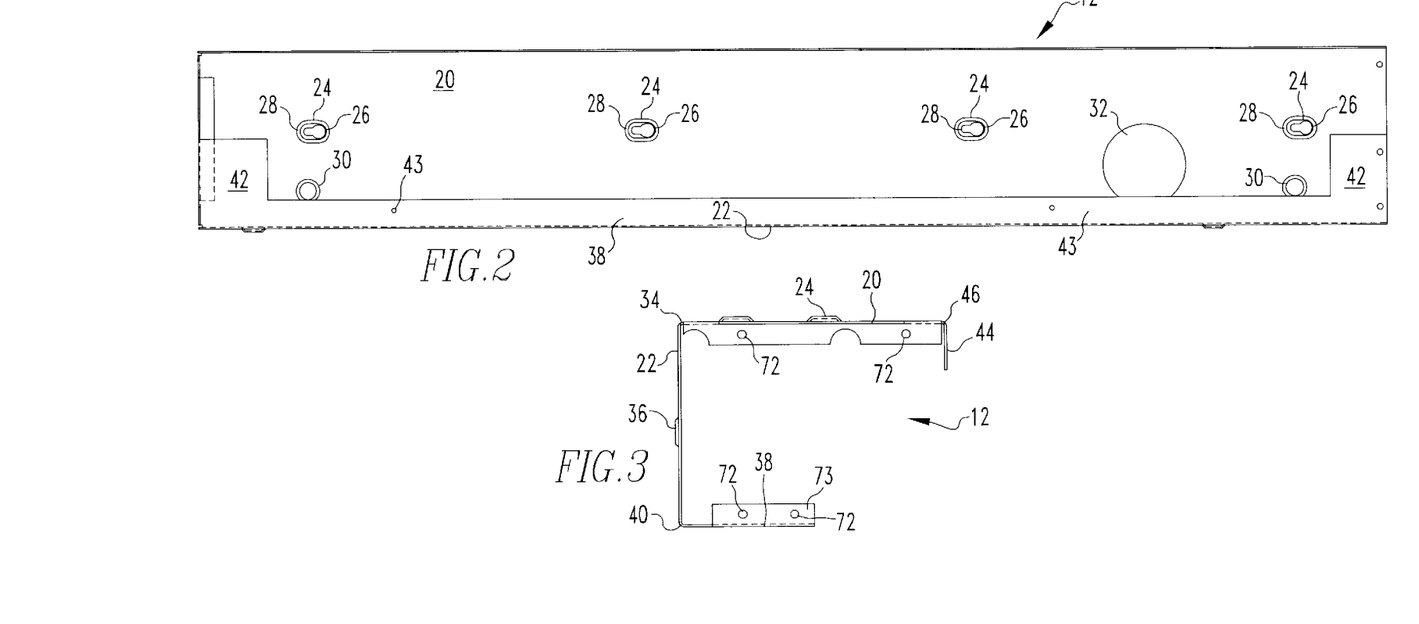
FIG. 2 is a side view of a base for a wire trough according to the present invention.
FIG. 3 is a top view of a base for a wire trough according to the present invention

Referring to FIGS. 1 to 3, base 12 is illustrated. The base 12 includes a first side 20, and a back 22, which are preferably substantially perpendicular to each other. The first side 20 includes means for mounting the base 12 to a metered panelboard cabinet, with a preferred means being the mounting holes 24. A preferred embodiment of the mounting hole 24 is keyhole shaped, having a large diameter portion 26 and a small diameter portion 28. The large diameter portion 26 is dimensioned and configured to permit passage of a screwhead therethrough, while the small diameter portion 28 is dimensioned and configured to permit passage of a screw shaft therethrough, but not a screwhead. Additional mounting apertures 30 may also be provided. A wire outlet aperture 32 may be provided at any point on the first side 20, corresponding to the location of a wire inlet aperture on the housing of the metered panelboard 86 to which the trough will he mounted. Alternatively, the base 12 may be supplied without a wire outlet aperture 32, permitting the wire outlet aperture 32 to be cut in any location desired at the time of installation.

The back 22 extends from the edge 34 of the first side 20. The back 22 may include mounting apertures 36. A lip 38 extends from the edge 40 of the back 22, extending substantially parallel to the first side 20. The lip 38 includes end portions 42, having a greater width than the remainder of the lip 38, and defines a pair of apertures 43 for receiving cover-securing screws. Both the first side 20 and back 22 include a flange 73 at their top end, defining a plurality of holes 72 for securing a top end cap 16 (described below).

A shelf 44 extends from the edge 46 of the first side 20, opposite and substantially parallel to the back 22. The shelf 44 preferably includes means for securing a cover 14, which may include a plurality of threaded studs 48 extending substantially perpendicular from the shelf 44.

Figures 4, 5, 6:
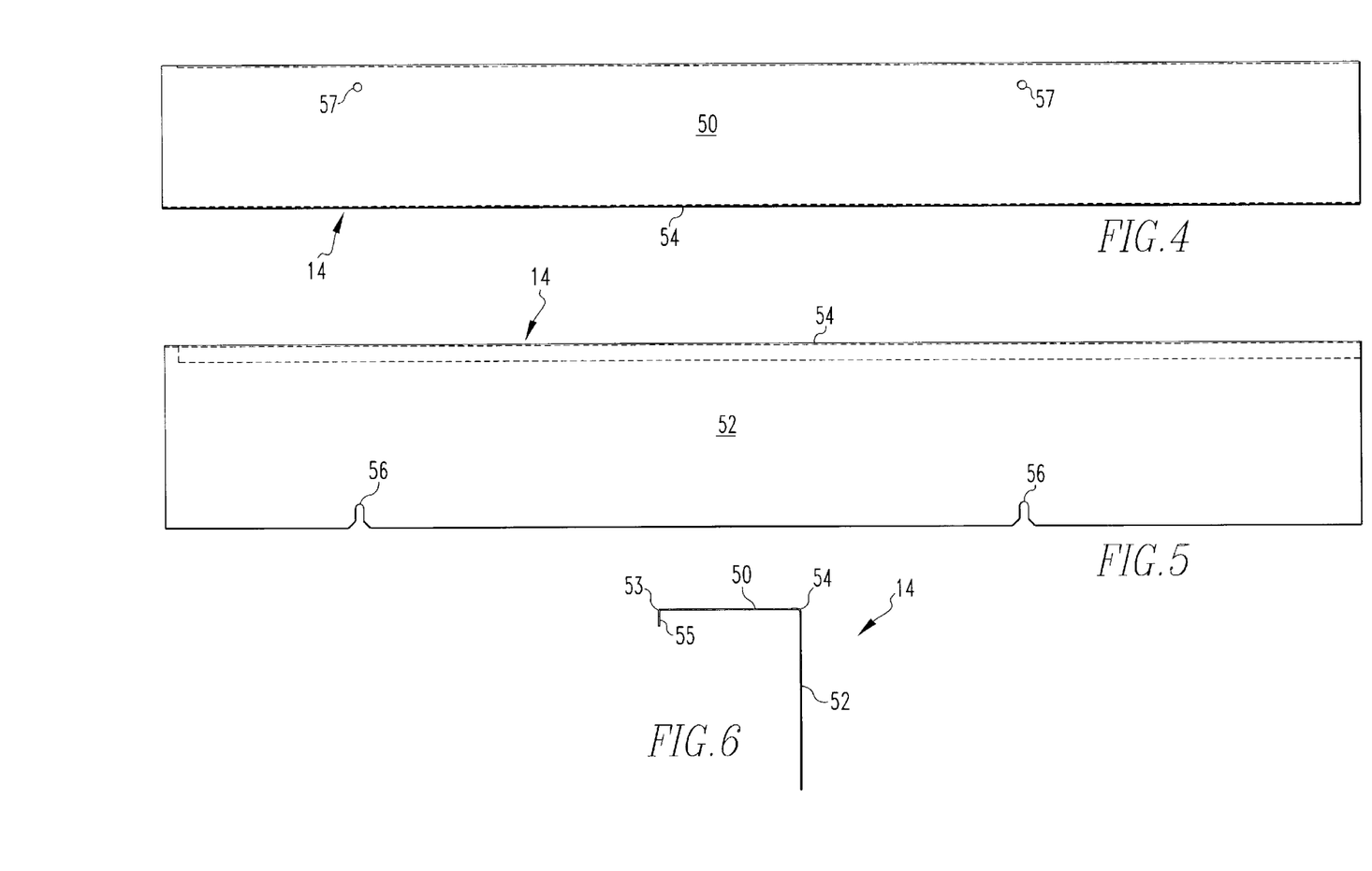
FIG. 4 is a front view of a cover for a wire trough according to the present invention.
FIG. 5 is a side view of a cover for a wire trough according to the present invention.
FIG. 6 is a top view of a cover for a wire trough according to the present invention.
Figure 7:
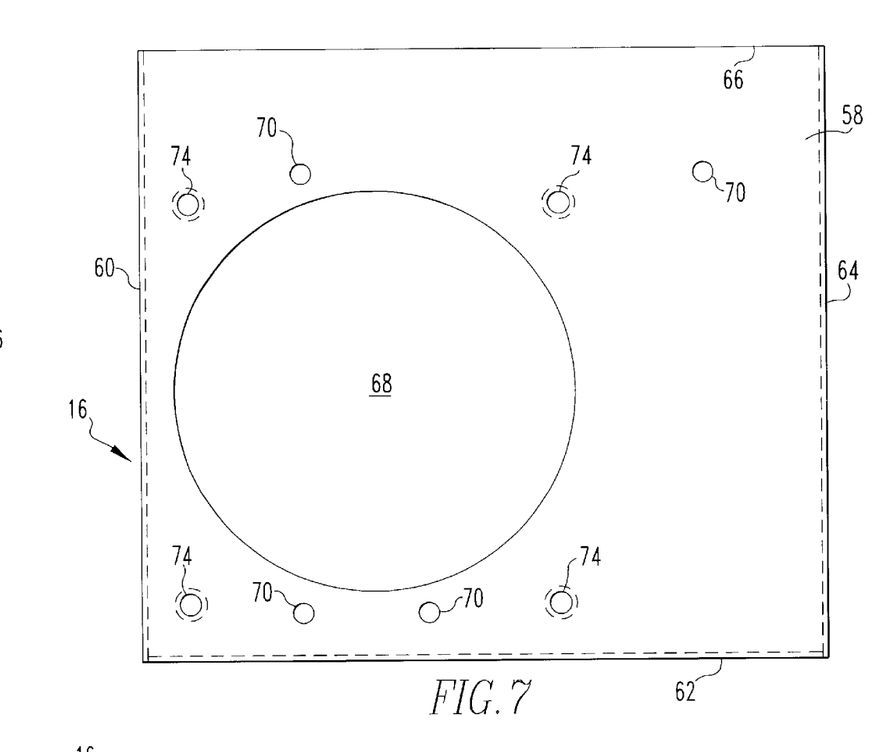
FIG. 7 is a top view of a top end cap for a wire trough of the present invention.
Figure 8:
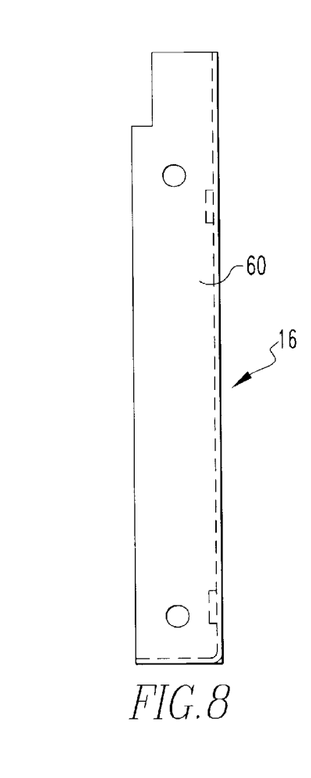
FIG. 8 is a back view of a top end cap for a wire trough according to the present invention.
Figure 9:
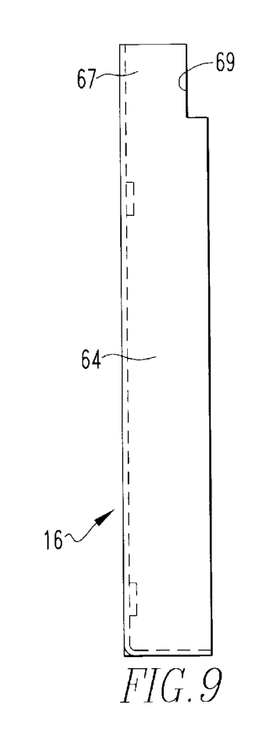
FIG. 9 is a front view of a top end cap for a wire trough according to the present invention.
Figure 10:
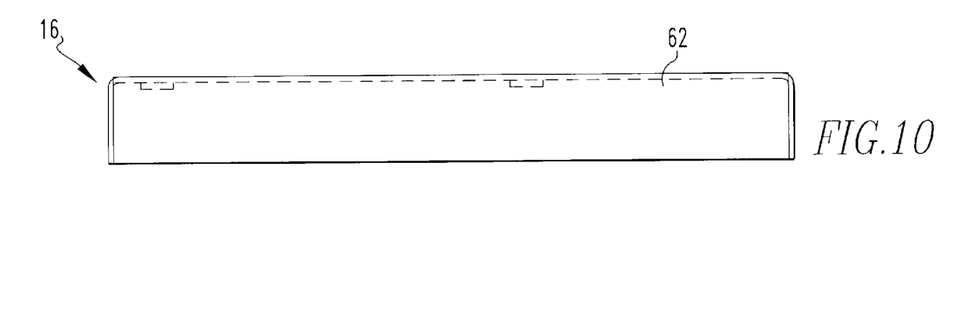
FIG. 10 is a side view of a top end cap for a wire trough according to the present invention.
Figure 11:
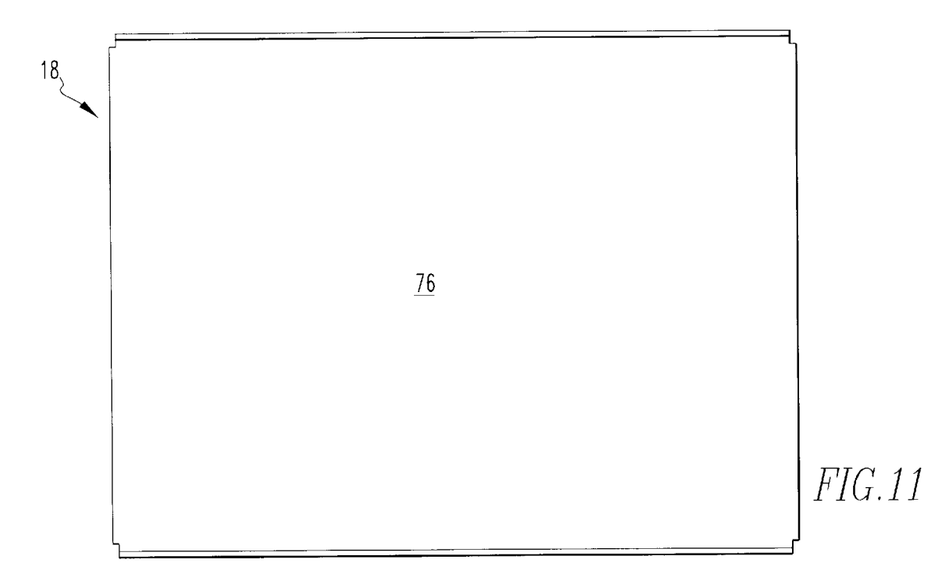
FIG. 11 is a bottom view of a bottom end cover for a trough according to the present invention.
Figure 12:
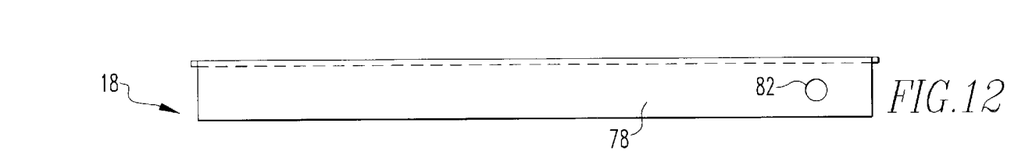
FIG. 12 is a side view of a bottom end cover for a wire trough according to the present invention.
Figure 13:
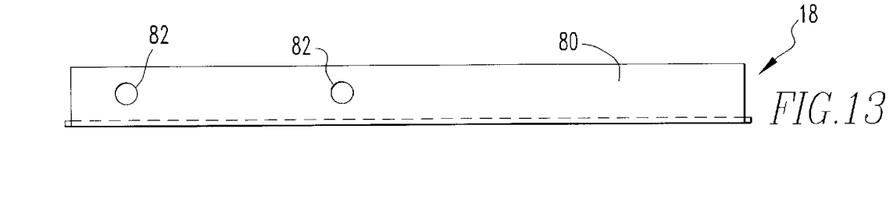
FIG. 13 is a side view of a bottom end cover for a wire trough according to the present invention.
Figure 14:
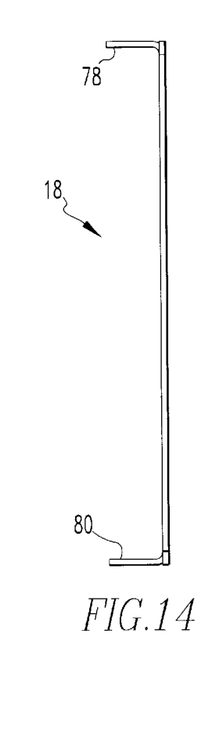
FIG. 14 is a front view of a bottom end cover for a wire trough according to the present invention.

Referring to FIGS. 4 to 6, a cover 14 is illustrated. The cover 14 includes a first side 50, and a front 52, extending substantially perpendicular from the 30 edge 54 of the first side 50. A lip 55 extends from the opposite edge 53 of the first side 50, substantially parallel to the front 52. The front 52 is dimensioned and configured to fit over the lip 38 of the base 12, and includes the slots 56, corresponding to the apertures 43 of the base's lip 38. The first side 50 includes an aperture 57 for receiving each of the threaded studs 48 on the base 12.

Figure 15:
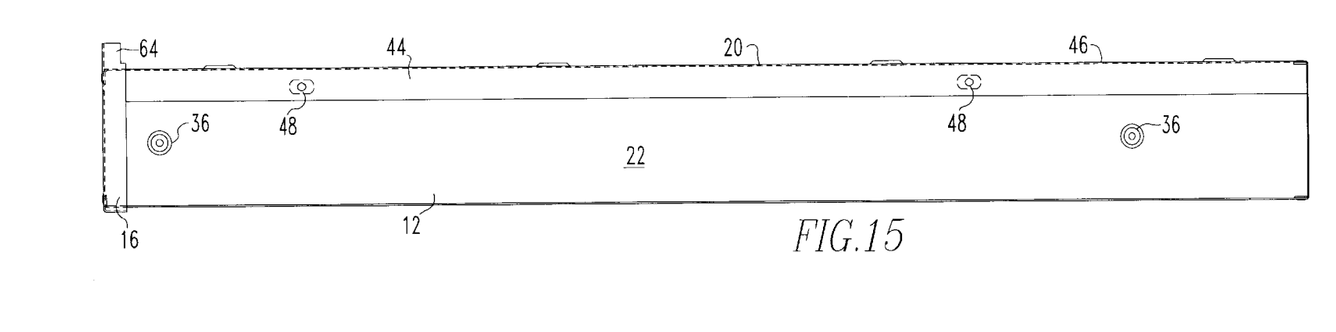
FIG. 15 is a front view of a base and top end plate for a wire trough according to the present invention.
Figures 16, 17:
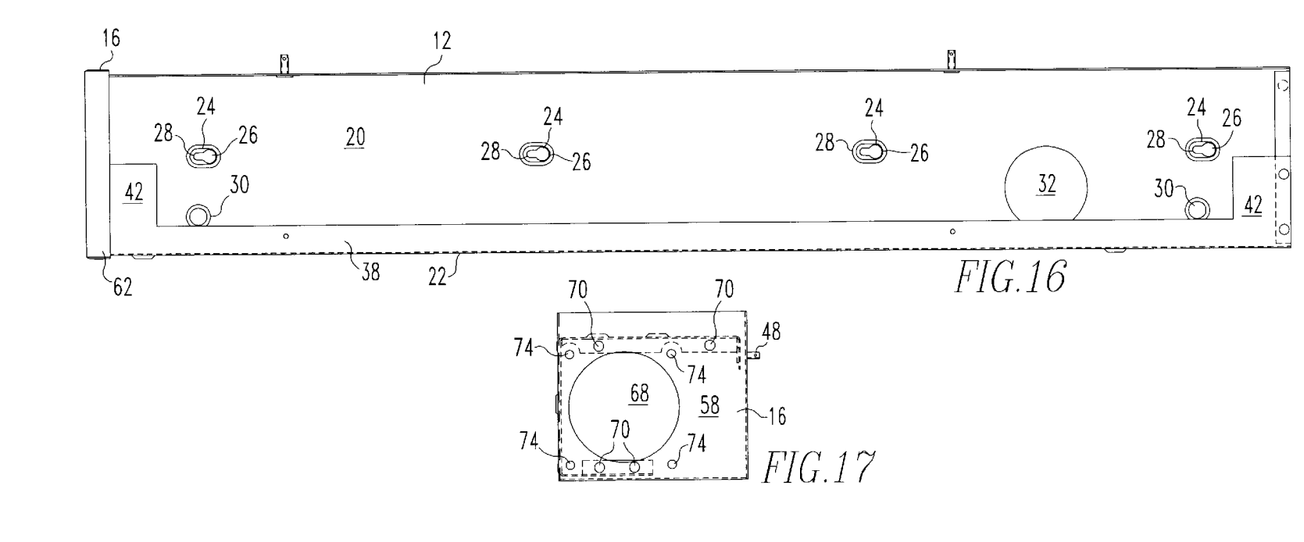
FIG. 16 is a side view of a base and top end plate for a wire trough according to the present invention.
FIG. 17 is a top view of a base and top cover for a wire trough according to the present invention

Referring to FIGS. 7 to 10, a top end cap 16 is illustrated. The top cap 16 includes a top face 58, and a back, first side, front, and second side 60, 62, 64, 66, respectively. The top face 58 includes a wire inlet aperture 68, dimensioned and configured to permit running electrical wiring to the trough 10. The second side 66 includes a lip 67, dimensioned and configured to overlap the top of a metered panelboard 86, with a gasket secured to its underside 69. A plurality of mounting apertures 70, corresponding to the mounting apertures 72 on the base 12, facilitates securing the top end cap 16 to the trough 10. The apertures 74 defined within the top face 58 permit a gasket 98 and hub cap100 (FIG. 21) to be secured to the top end cap 56. The wiring trough 10 will typically be supplied with the top end cap 16 installed on the base 12 (shown in FIGS. 15–17), and the hub cap 100 secured to the top end cap 16.

Referring to FIGS. 11 to 14, a bottom end cap 18 is illustrated. The bottom end cap 18 includes a bottom face 76 and a pair of sides 78, 80. Each of the sides 78, 80 may include apertures 82 for securing the bottom ends cap 18 to the trough 10. Typically, the wiring trough 10 will be supplied with the bottom end cap 18 secured in place.

The procedure for assembling the trough 10, and mounting the trough 10 on the housing 84 of a metered panelboard 86, is illustrated in FIGS. 15 to 23. Beginning with FIGS. 15–17, the aperture 32 is cut in the base 12 if such an aperture does not already exist. Alternatively, an aperture may be cut in the housing of the metered panelboard 86 to correspond to a preexisting aperture 32.

Figure 21:
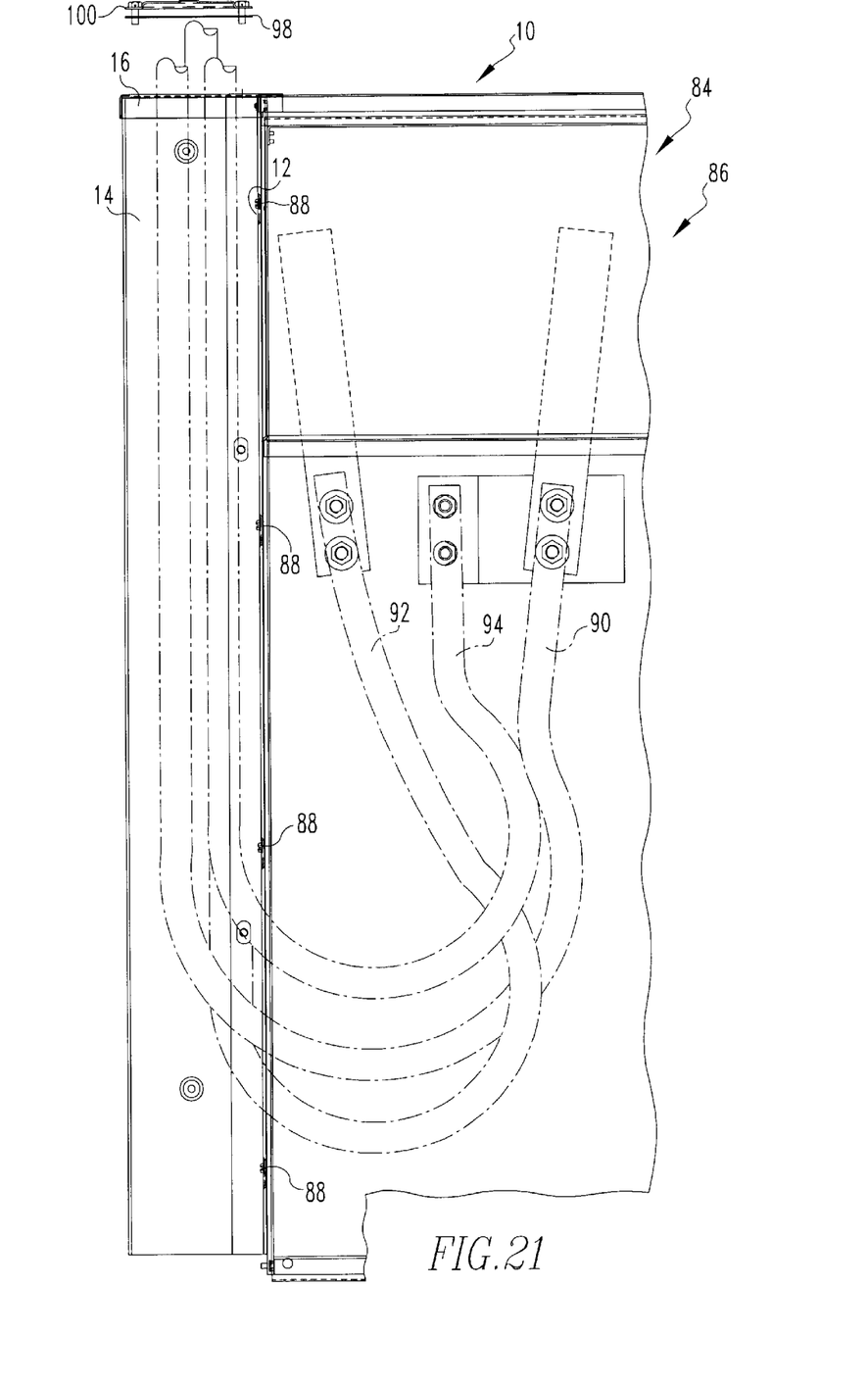
FIG. 21 is a front view of a wire trough according to the present invention, installed on a metered panelboard.
Figures 22, 23:
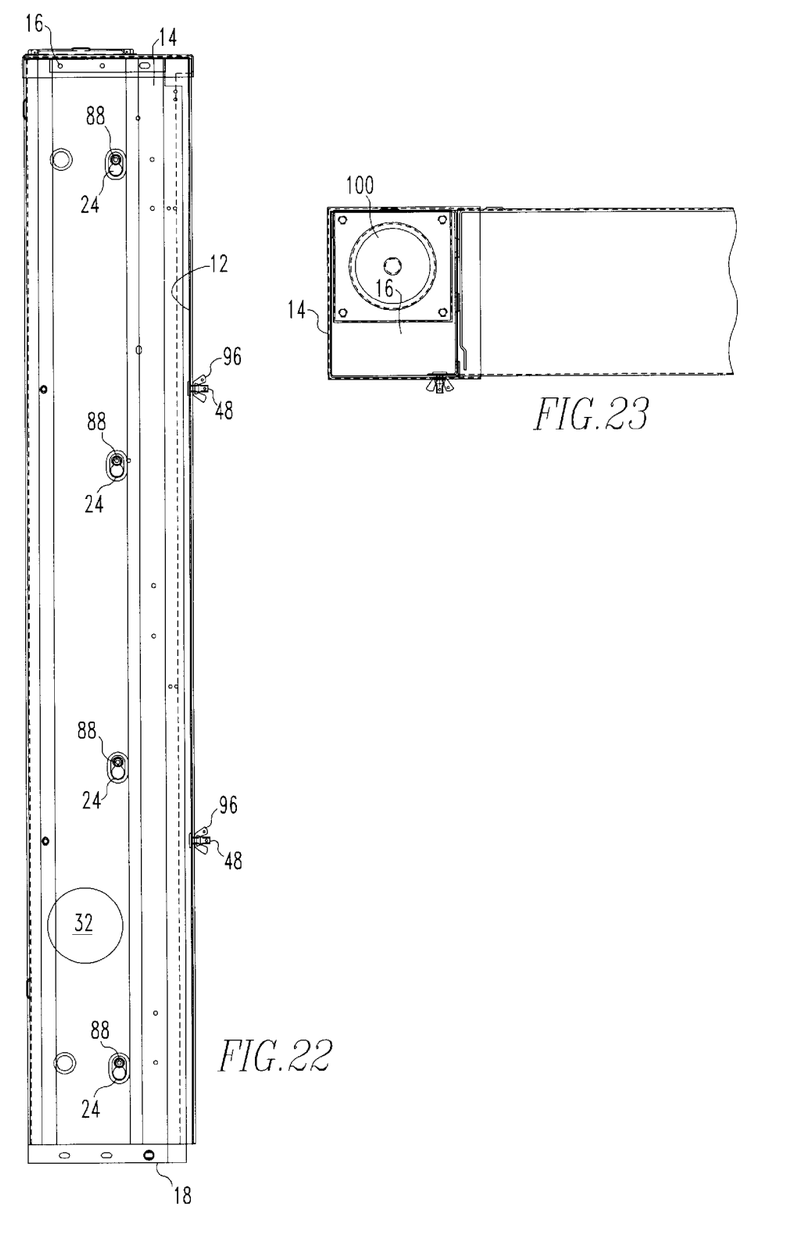
FIG. 22 is a side view of a wire trough according to the present invention, installed on a metered panelboard.
FIG. 23 is a top view of a wire trough according to the present invention, installed on a metered panelboard.

Referring to FIGS. 21–23, a plurality of screws 88 within the metered panelboard's housing 84 are loosened, the first side 20 of the base 12 is placed up against the housing 84 so that the screws 88 pass through the large diameter portion 26 of the mounting holes 24. The base 12 is then lowered so that the screws 88 are placed in the small diameter portion 28 of the mounting holes 24. The screws 88 are then tightened. At this point, the gasket on the underside 69 of lip 67 is pressed against the housing of the metered panelboard 86, thereby forming a rain-resistant seal between the wireway trough 10 and metered panelboard 86.

The hub cap 100 and gasket 98 are removed to allow installation of the appropriate threaded hub mounting to pass the entry wires through into the wireway. At this point, electrical wires 90, 92 and 94 may be run through the aperture 68 into the trough, down the length of the trough 10, through the aperture 32, and into the housing 84 of the metered panelboard 86.

Figure 18:
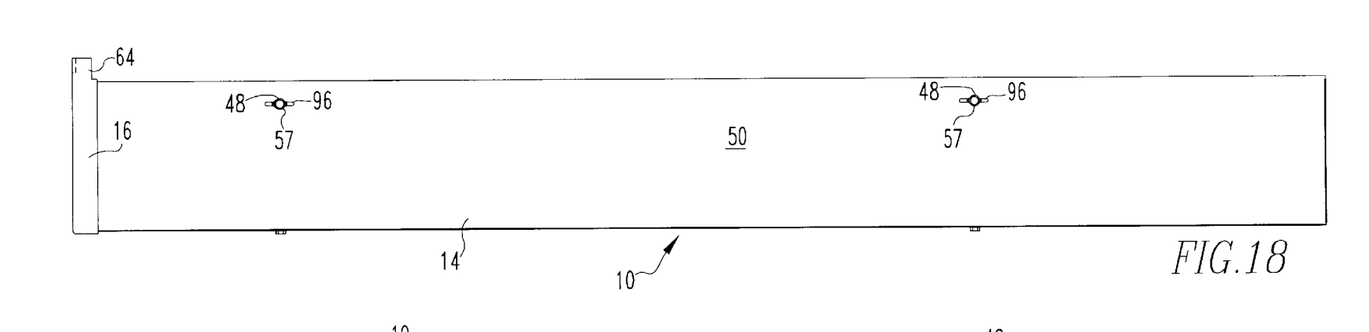
FIG. 18 is a front view of a wire trough according to the present invention.
Figures 19, 20:
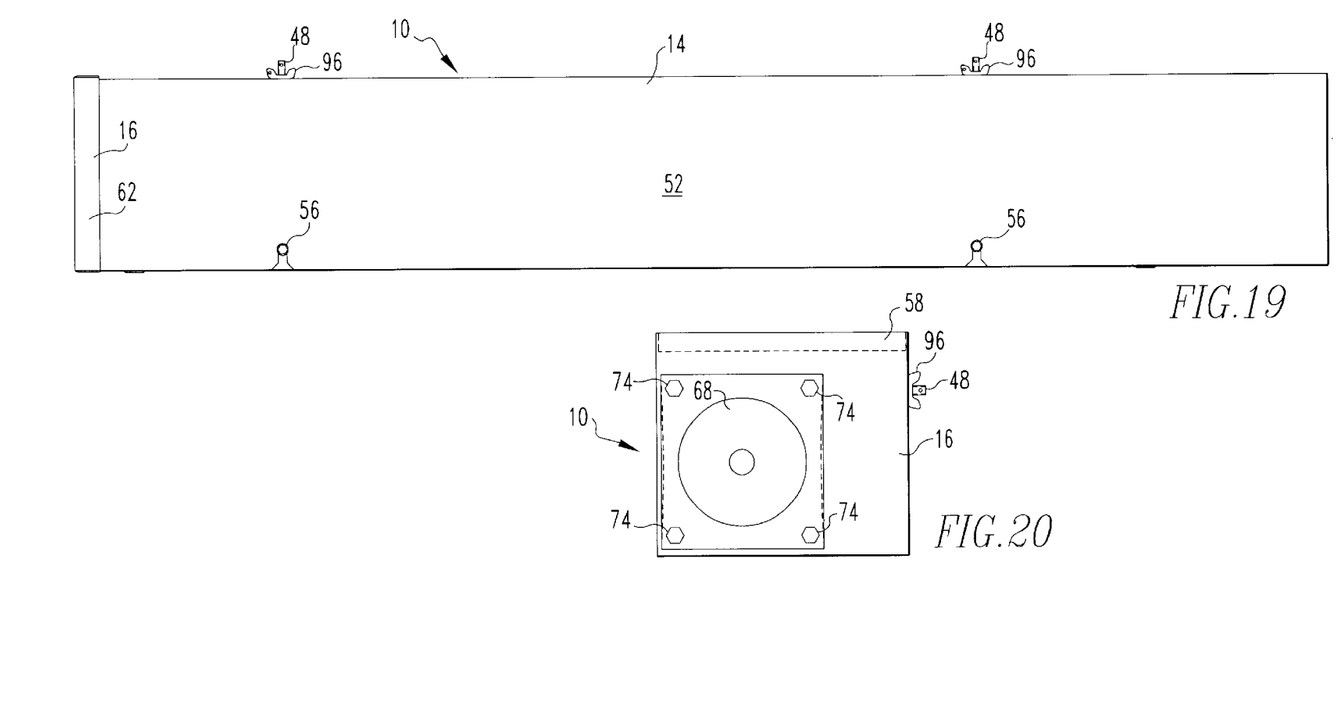
FIG. 19 is a side view of a wire trough according to the present invention.
FIG. 20 is a top view of a wire trough according to the present invention

Lastly, as shown in FIGS. 18–20, the cover 14 is installed on the trough 10. The front 52 of the cover 14 is positioned over the lip 38 of the base 12. The cover 14 is then rotated so that the lip 55 fits over the base's first side 20, and the apertures 57 on the first side 50 engage the threaded studs 48. Fastening means such as the wing nuts 96 may then be secured to the threaded studs 48, securing the cover 14 in place. Screws passing through the aperture 43 and slot 56 are used to secure the cover's front 52 to the base's lip 38.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof

What is claimed is:

1. A wiring trough for use with a metered panelboard having a housing, the wiring trough comprising:
   a base having a first side and a back extending substantially perpendicularly from the first side, said first side having means for mounting said base onto the housing of the metered panelboard, said first side further defining a wire outlet aperture;
   a cover having a first cover side and a front extending substantially perpendicularly from the first cover side, said cover having means for releasably securing said cover to said base;
   a top end cap secured at a top end of the wiring trough, defining a wire inlet aperture; and
   a bottom end cap secured at a bottom end of the wiring trough.

2. The wiring trough according to claim 1, wherein said means for mounting the base to onto the housing of the metered panelboard include keyhole-shaped mounting holes defined within one said first side of the base.

3. The wiring trough according to claim 1, wherein the base further comprises a base lip extending from said base, opposite and substantially parallel to the first side of said base.

4. The wiring trough according to claim 3, wherein the means for releasably securing the said cover to the said base include the front of said cover being dimensioned and configured to fit over said base the base's lip, and a cover lip extending from said an edge of the cover's first cover side, opposite and substantially parallel to the cover's said front, the cover's said cover lip being dimensioned and configured to fit over the first side of the base.

5. The wiring trough according to claim 1, wherein the base further includes a shelf extending from an edge of the base's said first side of said base, opposite and substantially parallel to said base back.

6. The wiring trough according to claim 5, wherein the means for releasably securing the said cover to the said base include:
   at least one threaded stud extending from and substantially perpendicular to the shelf; and
   a hole defined within the first cover side of the cover corresponding to each of the threaded studs.

7. The wiring trough according to claim 6, further comprising a nut dimensioned and configured to engage each a threaded studs for securing said first side of said cover on said threaded studs.

8. The wiring trough according to claim 7, wherein said nut is a wing nut.

9. The wiring trough according to claim 1, wherein said top end cap defines a top end cap lip having a gasket dimensioned and configured to fit between the top end cap lip and the metered panelboard housing, and to resist passage of water therethrough.

10. The wiring trough according to claim 1, wherein the wiring trough resists the entrance of water therein.

11. The wiring trough according to claim 1, wherein the top end cap is dimensioned and configured to receive a threaded hub mounting.

12. A wiring trough for use with a panelboard having a housing, the wiring through comprising:
    a base having a first side and a back extending substantially perpendicularly from the first side, said first side having means for mounting said base onto the housing of the panelboard, said first side or said back or both further defining a wire outlet aperture;
    a cover having a first cover side and a front extending substantially perpendicularly from the first cover side;
    securing means for releasably securing said cover to said base;
    said base and cover defining a cap end; and
    a top end cap secured at said top end, defining a wire inlet aperature.

* * * * *